(12) United States Patent
Johnson et al.

(10) Patent No.: US 8,619,846 B2
(45) Date of Patent: Dec. 31, 2013

(54) AMPLITUDE CONTROL IN A VARIABLE LOAD ENVIRONMENT

(75) Inventors: Bryce Johnson, Breezy Point, MN (US); Paul Virden, Backus, MN (US)

(73) Assignee: Landis+Gyr, Pequot Lakes, MN (US)

( * ) Notice: Subject to any disclaimer, the term of this patent is extended or adjusted under 35 U.S.C. 154(b) by 282 days.

(21) Appl. No.: 13/091,409

(22) Filed: Apr. 21, 2011

(65) Prior Publication Data

US 2012/0269244 A1    Oct. 25, 2012

(51) Int. Cl.
H04B 3/46       (2006.01)

(52) U.S. Cl.
USPC .......... 375/224; 375/219; 375/222; 375/259; 375/316; 375/377

(58) Field of Classification Search
USPC ......... 375/211, 219, 220, 222, 224, 257, 259, 375/295, 316, 326, 377
See application file for complete search history.

(56) References Cited

U.S. PATENT DOCUMENTS

| | | | |
|---|---|---|---|
| 4,479,215 A | 10/1984 | Baker | |
| 5,581,229 A | 12/1996 | Hunt | |
| 6,154,488 A | 11/2000 | Hunt | |
| 6,177,884 B1 | 1/2001 | Hunt et al. | |
| 6,549,120 B1 | 4/2003 | De Buda | |
| 6,947,854 B2 * | 9/2005 | Swarztrauber et al. | 702/62 |
| 6,998,963 B2 | 2/2006 | Flen et al. | |
| 7,102,490 B2 | 9/2006 | Flen et al. | |
| 7,145,438 B2 * | 12/2006 | Flen et al. | 714/776 |
| 7,180,412 B2 | 2/2007 | Bonicatto et al. | |
| 7,184,861 B2 | 2/2007 | Petite | |
| 7,209,840 B2 | 4/2007 | Petite et al. | |
| 7,224,740 B2 | 5/2007 | Hunt | |
| 7,236,765 B2 | 6/2007 | Bonicatto et al. | |
| 7,248,158 B2 * | 7/2007 | Berkman et al. | 340/538 |
| 7,346,463 B2 | 3/2008 | Petite et al. | |
| 7,406,094 B2 | 7/2008 | Propp et al. | |
| 7,432,824 B2 | 10/2008 | Flen et al. | |
| 7,443,313 B2 | 10/2008 | Davis et al. | |
| 7,456,588 B2 * | 11/2008 | Alexandrov | 315/294 |
| 7,468,661 B2 | 12/2008 | Petite et al. | |
| 7,706,320 B2 | 4/2010 | Davis et al. | |
| 7,738,999 B2 | 6/2010 | Petite | |
| 7,742,393 B2 | 6/2010 | Bonicatto et al. | |
| 7,774,530 B2 | 8/2010 | Haug et al. | |
| 7,791,468 B2 * | 9/2010 | Bonicatto et al. | 340/538.11 |
| 7,877,218 B2 | 1/2011 | Bonicatto et al. | |
| 7,978,059 B2 | 7/2011 | Petite et al. | |
| 7,978,772 B2 * | 7/2011 | Koga et al. | 375/260 |

(Continued)

*Primary Examiner* — Hirdepal Singh
(74) *Attorney, Agent, or Firm* — Crawford Maunu PLLC

(57) ABSTRACT

Methods, systems, and apparatus, including computer programs encoded on a computer storage medium, for varying symbol amplitude. In one aspect, a system includes a symbol generator that includes a waveform generator configured to output waveforms at a plurality of selectable fundamental frequencies and with a selectable duty cycle. The symbol generator can also include a bandpass filter having a passband that corresponds to a communications channel of a communications network. The system can also include data processing apparatus operable to interact with the symbol generator and further operable to determine that at least a threshold number of endpoints that receive symbols from the symbol generator are experiencing a same type of transmission error. In response to the determination, the data processing apparatus can cause the waveform generator to adjust at least one of the fundamental frequency or a duty cycle of the waveforms. The fundamental frequency can be adjusted to a frequency having a harmonic that is within the pass-band.

20 Claims, 5 Drawing Sheets

(56) References Cited

U.S. PATENT DOCUMENTS

| | | | |
|---|---|---|---|
| 8,144,816 B2 | 3/2012 | Bonicatto et al. | |
| 8,144,820 B2 | 3/2012 | Bonicatto | |
| 8,170,524 B2 * | 5/2012 | Abbot et al. | 455/402 |
| 8,194,789 B2 | 6/2012 | Wolter et al. | |
| 8,238,263 B2 | 8/2012 | Kohout et al. | |
| 8,352,594 B2 * | 1/2013 | Ishii et al. | 709/224 |
| 2002/0010870 A1 * | 1/2002 | Gardner | 713/300 |
| 2008/0304595 A1 | 12/2008 | Haug et al. | |
| 2010/0231365 A1 | 9/2010 | Maruoka | |
| 2011/0121952 A1 | 5/2011 | Bonicatto et al. | |
| 2011/0176598 A1 | 7/2011 | Kohout et al. | |
| 2011/0218686 A1 | 9/2011 | McHann, Jr. et al. | |
| 2011/0249678 A1 | 10/2011 | Bonicatto et al. | |
| 2012/0027062 A1 * | 2/2012 | Garcia | 375/224 |
| 2012/0057592 A1 | 3/2012 | Zeppetelle et al. | |
| 2012/0076212 A1 | 3/2012 | Zeppetelle et al. | |
| 2012/0084559 A1 | 4/2012 | Bonicatto | |
| 2012/0106664 A1 | 5/2012 | Bonicatto et al. | |
| 2012/0188063 A1 * | 7/2012 | Abbot et al. | 340/12.32 |

* cited by examiner

AMPLITUDE CONTROL IN A VARIABLE LOAD ENVIRONMENT

BACKGROUND

This specification relates to data communications.

Service providers utilize distributed networks to provide services to customers over large geographic areas. For example, communications companies utilize a distributed communications network to provide communications services to customers. Similarly, power companies utilize a network of power lines, meters and other network elements to provide power to customers throughout a geographic region and to receive data about the power usage.

These service providers depend on proper operation of their respective networks to deliver services to the customers and receive data regarding the services provided. For example, the service provider may want access to daily usage reports to efficiently bill their customers for the resources that are consumed or otherwise utilized by the customers. Service providers may also transmit data such as software commands, firmware updates, and other information to network elements to facilitate proper operation of the network elements. Therefore, it is important for data being transmitted over the network to be reliably received by the network elements.

In power line communication (PLC) networks, a power substation can include an endpoint control apparatus that sends data to endpoints (e.g., meters, load control switches, remote service switches, and other endpoints) in the network. For example, the endpoint control apparatus can transmit data specifying updated communications channel assignments, synchronization data, and/or updated firmware to the endpoints in the PLC network. If the amplitude at which the data are transmitted is too low, the endpoints may not receive the data that are transmitted by the endpoint control apparatus. However, if the amplitude at which the data are transmitted is too high, the data may be received by neighboring endpoints that are assigned to another endpoint control apparatus, which may interfere with proper functioning of the neighboring endpoints.

SUMMARY

In general, one innovative aspect of the subject matter described in this specification can be embodied in a system including a symbol generator that includes a waveform generator configured to output waveforms at a plurality of selectable fundamental frequencies and with a selectable duty cycle. The symbol generator can also include a bandpass filter having a pass-band that corresponds to a communications channel of a communications network. The system can also include data processing apparatus operable to interact with the symbol generator and further operable to determine that at least a threshold number of endpoints that receive symbols from the symbol generator are experiencing a same type of transmission error. In response to the determination, the data processing apparatus can cause the waveform generator to adjust at least one of the fundamental frequency or a duty cycle of the waveforms. The fundamental frequency can be adjusted to a frequency having a harmonic that is within the pass-band. Other embodiments of this aspect include corresponding methods, apparatus, and computer programs, configured to perform the actions of the methods, encoded on computer storage devices.

These and other embodiments can each optionally include one or more of the following features. The data processing apparatus can be further operable to perform operations including: receiving transmission quality data specifying a bit error rate as for symbols that were generated by the symbol generator and received by the endpoints. Determining that at least a threshold number of endpoints are experiencing a same type of transmission error can include determining that at least the threshold number of endpoints are detecting a bit error rate that exceeds a threshold bit error rate.

The data processing apparatus can be operable to adjust at least one of the fundamental frequency or a duty cycle by being configured to cause the waveform generator to increase the fundamental frequency in response to determining that at least the threshold number of endpoints are detecting the bit error rate that exceeds the threshold bit error rate. The data processing apparatus can be operable to cause the waveform generator to adjust at least one of the fundamental frequency or a duty cycle by being configured to cause the waveform generator to increase both the fundamental frequency and the duty cycle in response to determining that at least the threshold number of endpoints are detecting the bit error rate that exceeds the threshold bit error rate.

The data processing apparatus can be operable to cause the waveform generator to adjust at least one of the fundamental frequency or a duty cycle by being configured to cause the waveform generator to increase the duty cycle in response to determining that at least the threshold number of endpoints are detecting the bit error rate that exceeds the threshold bit error rate.

The data processing apparatus can be further operable to perform operations including receiving transmission quality data specifying that a number of neighboring endpoints with which a neighboring substation is communicating has decreased relative to a number of neighboring endpoints with which the neighboring substation is assigned to communicate. Determining that at least a threshold number of endpoints are experiencing a same type of transmission error can include determining that at least the threshold number of neighboring endpoints with which the neighboring endpoints are communicating has decreased more than a threshold amount.

The data processing apparatus can be operable to cause the waveform generator to adjust at least one of the fundamental frequency or a duty cycle by being configured to cause the waveform generator to decrease the fundamental frequency in response to determining that at least the threshold number of neighboring endpoints with which the neighboring endpoints are communicating has decreased more than a threshold amount. The data processing apparatus can be operable to cause the waveform generator to adjust at least one of the fundamental frequency or a duty cycle by being configured to cause the waveform generator to decrease both the fundamental frequency and the duty cycle in response to determining that at least the threshold number of neighboring endpoints with which the neighboring endpoints are communicating has decreased more than a threshold amount.

The data processing apparatus can be operable to cause the waveform generator to adjust at least one of the fundamental frequency or a duty cycle by being configured to cause the waveform generator to decrease the duty cycle in response to determining that at least the threshold number of neighboring endpoints with which the neighboring endpoints are communicating has decreased more than a threshold amount.

In general, another aspect of the subject matter described in this specification can be embodied in methods that include the actions of selecting a first fundamental frequency for symbols that are transmitted to endpoints in a communications system, the first fundamental frequency being selected so that a baseline harmonic of the first fundamental frequency is within a downstream channel over which data are transferred from a substation to the endpoints, the baseline harmonic being at least a second harmonic of the first fundamental frequency; receiving status data from the endpoints, the status data for each endpoint specifying a number of bit errors that have been detected by the endpoint; determining that the status data from at least a threshold number of the endpoints specify a number of bit errors that exceeds a threshold number of bit errors; and adjusting the first fundamental frequency to a second fundamental frequency that is higher than the first fundamental frequency, the second fundamental frequency being a frequency at which a lower harmonic than the baseline harmonic is within the downstream channel. Other embodiments of this aspect include corresponding systems, apparatus, and computer programs, configured to perform the actions of the methods, encoded on computer storage devices.

These and other embodiments can each optionally include one or more of the following features. Receiving status data further can include receiving, from each of the endpoints, status data that are indicative of endpoint identity. Determining that status data from at least a threshold number of the endpoints specify a number of bit errors that exceeds a threshold number of bit errors can include identifying, based on the status data, the endpoints with which the substation is assigned to communicate; and determining that the status data for at least the threshold number of the identified endpoints specify a number of bit errors that exceeds the threshold number of bit errors. Identifying the endpoints with which the substation is assigned to communicate can include identifying the endpoints having unique identifiers that are included in a set of network identifiers for endpoints with which the substation is assigned to communicate.

Methods can further include the actions of determining that status data are being received from at least a threshold number of neighboring endpoints, each neighboring endpoint being an endpoint with which the substation is not assigned to communicate; and adjusting the first fundamental frequency to a third fundamental frequency, the third fundamental frequency being a frequency at which a higher harmonic than the baseline harmonic is within the downstream channel.

Determining that status data are being received from at least the threshold number of neighboring endpoints can include receiving data indicating that a number of endpoints with which a neighboring substation is communicating has decreased relative to a number of endpoints with which the neighboring substation is assigned to communicate; and determining that the number of endpoints with which the neighboring substation is communicating has decreased more than a threshold amount.

Methods can further include the actions of transmitting the symbols to the endpoints, the symbols having an initial fundamental frequency that is within the downstream channel and being transmitted at a first amplification factor; and determining that at least a threshold number of neighboring endpoints are receiving the symbols, each neighboring endpoint being an endpoint with which the substation is not assigned to communicate. Selecting the first fundamental frequency can include reducing the initial fundamental frequency to a reduced frequency at which a harmonic of the reduced frequency is within the downstream channel; determining that the symbols are being received from fewer than the threshold number of neighboring endpoints; and selecting the reduced frequency to be the first fundamental frequency.

Methods can further include the actions of transmitting the symbols to the endpoints at the first amplification factor, the symbols being generated at the first fundamental frequency. Methods can further include the actions of following adjustment of the first fundamental frequency, adjusting a duty cycle of the second fundamental frequency until an amplitude of the symbol is within a target amplitude range.

In general, another aspect of the subject matter described in this specification can be embodied in methods that include the actions of transmitting symbols from a substation to endpoints in a communications network, the symbols being transmitted at a first frequency and amplified at an amplification factor, the first frequency being a harmonic of a fundamental frequency for the symbols, the harmonic being within a downstream channel over which the substation communicates with the endpoints; receiving transmission quality data specifying a measure of transmission quality for the symbols; determining that at least a threshold number of endpoints in the communications network are experiencing a same type of transmission error; adjusting the fundamental frequency based on the type of transmission error, the fundamental frequency being adjusted so that a different harmonic of the adjusted fundamental frequency is within the downstream channel; and transmitting the symbols over the downstream channel, the symbols being generated at the fundamental frequency and amplified at the amplification factor. Other embodiments of this aspect include corresponding systems, apparatus, and computer programs, configured to perform the actions of the methods, encoded on computer storage devices.

In general, another aspect of the subject matter described in this specification can be embodied in methods that include the actions of generating a first symbol at a first fundamental frequency; filtering the first symbol with a filter having a pass-band that includes a harmonic frequency of the first fundamental frequency; amplifying the filtered first symbol at an amplification factor; determining that at least a threshold number of communications errors are occurring at endpoints to which the first filtered symbols are being transmitted; generating a second symbol at a second fundamental frequency that is different than the first fundamental frequency, the second fundamental frequency having a harmonic that is within the pass-band; filtering the second symbol with the filter; and amplifying the second filtered symbol at the amplification factor. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. The amplitude at which data are transmitted through a network may be remotely adjusted without adjusting the output amplitude of the transmitter that is transmitting the data. The reliability of data communications over a network having a variable load can be increased (relative to constant amplitude transmissions) by adjusting the amplitude at which data are transmitted in response to changes in load. The reliability of data communications over a network having a variable load can be increased (relative to constant amplitude transmissions) by adjusting the amplitude at which data are transmitted in response to detecting a threshold packet loss.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Power line communications (PLC) networks, as well as many other communications networks change over time as network elements can be added to and/or removed from the network over time. For example in a PLC network, additional endpoints (e.g., power meters), service points (e.g., homes or businesses), switches, and/or capacitor banks can be added to, or removed from, the network over time. These changes in the network cause the load of the network to change over time, which can make it difficult to communicate over the network. For example, as the load of the network changes, it may be necessary to adjust the amplitude of communications signals that are being transmitted over the network. However, many amplifiers that are used to transmit data through communications networks, such as a PLC network, may have manually selectable amplification parameters (e.g., amplification factors), and these amplifiers may be located in remote areas, such that making adjustments to the amplification parameters is time consuming and potentially costly.

As described in more detail below, the data that are transmitted over a communications network may be transmitted over one or more communications channels, and the waveforms that represent the data may be filtered to remove spectral components that are outside of the communications channel. Because the "out-of-channel" spectral components are filtered, the waveform that is used to represent the data can need not have a fundamental frequency that passes through the filter, as long as the waveform has harmonic components that are passed through the filter.

At certain duty cycles (e.g., 50% duty cycle), the amplitude of harmonic spectral components is inversely proportional to the "order" of the harmonic. For example, when the fundamental frequency is transmitted with a 50% duty cycle, a third order harmonic (i.e., the third harmonic) of the fundamental frequency will have higher amplitude than the fifth order harmonic (i.e., the fifth harmonic) of the same fundamental frequency. Thus, the fundamental frequency of a communications signal may be varied to change the harmonic of the fundamental frequency that passes through the filter, which, in turn, will adjust the amplitude of the symbol that is transmitted through the communications network. The elements of the communications network that generate waveforms representing data are generally capable of being remotely adjusted, such that the fundamental frequency at which these elements generate waveforms can be specified remotely. Thus, the amplitude of the waveforms that are transmitted over the network can be remotely controlled by adjusting the fundamental frequency at which these elements generate waveforms.

The description that follows describes adjusting amplitudes of signals being transmitted over a PLC network. However, the apparatus and methods described below can be implemented in other communications networks and other computing environments.

Figure 1:
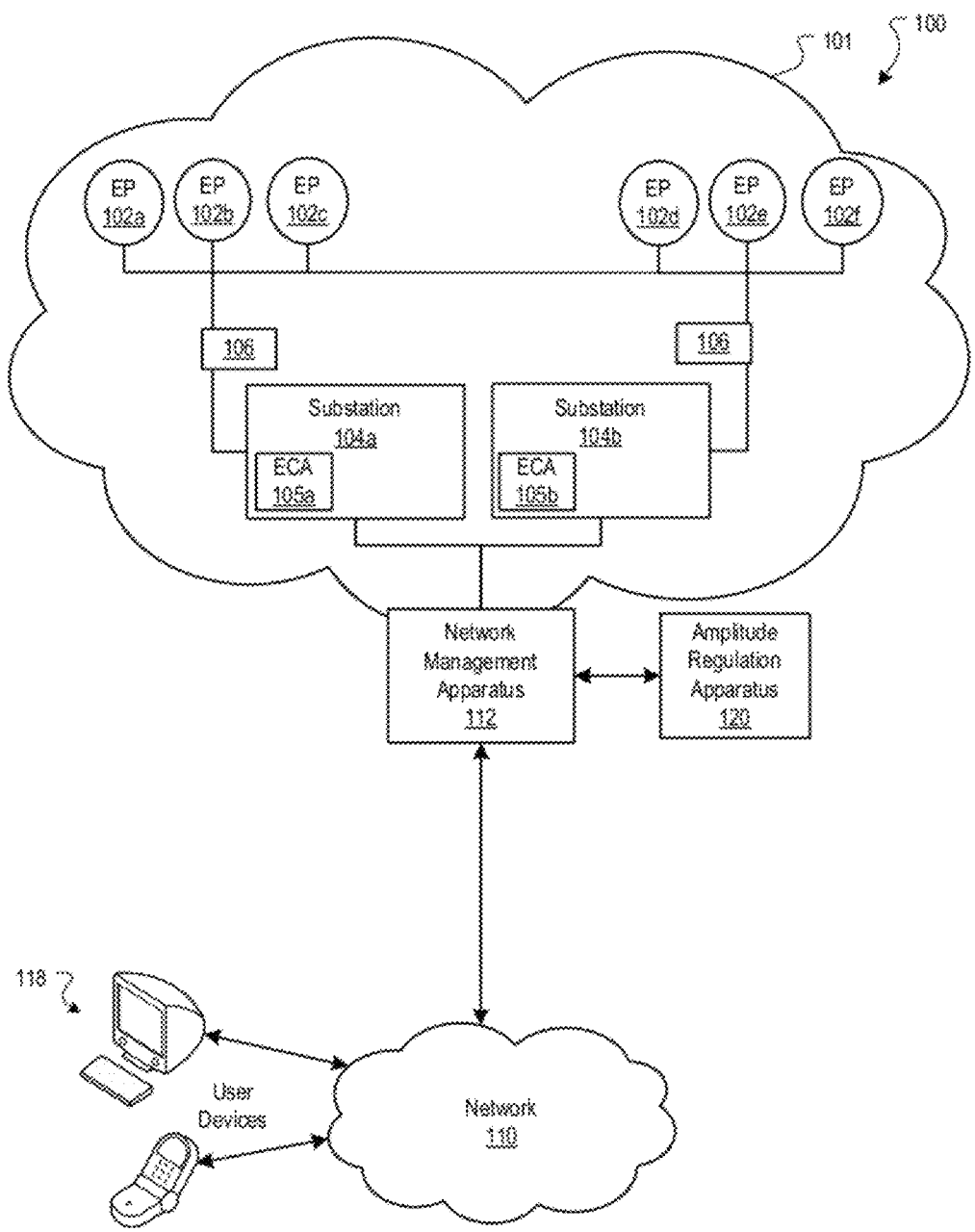
FIG. 1 is a block diagram of an example network environment in which an endpoint control apparatus communicates with endpoints.

FIG. 1 is a block diagram of an example network environment in which endpoint control apparatus 105 communicates with endpoints 102a-102f (collectively referred to as "endpoints 102"). The network environment 100 includes a service network 101 in which endpoints 102 are coupled (e.g., communicatively coupled) to substations 104a, 104b (collectively referred to as "substations 104"). The substations 104 are systems that facilitate power distribution to the endpoints 102. The substations 104 each include an endpoint control apparatus 105a, 105b (collectively referred to as "endpoint control apparatus 105") that transmits data to the endpoints 102, as described in more detail below.

The network 101 includes a network management apparatus 112. In some implementations, the network management apparatus 112 is a data processing apparatus that processes communications that are received from substations 104 and/or controls aspects of the service network 101 based, at least in part, on information extracted from the symbols 106 that were received from the substations 104.

For example, in a PLC network, the network management apparatus 112 can receive data from the substations 104 indicating that power usage is significantly higher in a particular portion of a power network than in other portions of the power network. Based on this data, the network management apparatus 112 can allocate additional resources to that particular portion of the network (i.e., load balance) or provide data specifying that there is increased power usage in the particular portion of the power network.

In some implementations, the network management apparatus 112 provide data to user devices 118 that can be accessed, for example, by the network operator, maintenance personnel and/or customers. For example, data identifying the increased power usage described above can be provided to a user device 118 accessible by the network operator, who can, in turn, determine an appropriate action regarding the increased usage. Additionally, data identifying a time-of-use measure and/or a peak demand measure can also be provided to the user device 118. Similarly, if there has been a power outage, the network management apparatus 112 can provide data to user devices 118 that are accessible by customers to provide information regarding the existence of the outage and potentially provide information estimating duration of the outage.

The data network 110 can be a wide area network (WAN), local area network (LAN), the Internet, or any other communications network. The data network 110 can be implemented as a wired or wireless network. Wired networks can include any media-constrained networks including, but not limited to, networks implemented using metallic wire conductors, fiber optic materials, or waveguides. Wireless networks include all free-space propagation networks including, but not limited to, networks implemented using radio wave and free-space optical networks. While only two substations 104a, 104b and one network management apparatus 112 are shown, the service network 101 can include many different substations 104 that can each communicate with thousands of end points 102 and many different network management apparatus 112 that can each communicate with multiple substations 104.

The end points 102 can be any device capable of transmitting and/or receiving data in the network environment 100. For example, the end points 102 can be meters with endpoints in a utility network, computing devices, television set top terminals or telephones that transmit data in the service network 101. The description that follows refers to the end points 102 as power meters in a power distribution network. However, the description that follows is applicable to other types of end points 102 in utility networks or other networks. For example, the description that follows is applicable to gas meters and water meters that are respectively installed in gas and water distribution networks.

The end points 102 can be implemented to monitor and report various operating characteristics of the service network 101. For example, in a power distribution network, meters can monitor characteristics related to power usage in the network. Example characteristics related to power usage in the network include average or total power consumption, power surges, power drops and load changes, among other characteristics. In gas and water distribution networks, meters can measure similar characteristics that are related to gas and water usage (e.g., total flow and pressure).

Each of the substations 104 includes an endpoint control apparatus (ECA) 105. The endpoint control apparatus 105 is a data processing apparatus that transmits data downstream to the endpoints 102. The endpoint control apparatus 105 can include, for example, a waveform generator that can generate various waveforms (e.g., square waves, sine waves, and/or waveforms having other shapes) at a range of fundamental frequencies (e.g., 50 Hz-10,000 Hz). The endpoint control apparatus 105 can also include an output amplifier that can amplify waveforms at one or more selectable output amplitudes (e.g., 0.10-1.0V). The endpoint control apparatus 105 receives data that are to be transmitted to the endpoints 102, and can generate a waveform representing the data and/or encode the data for transmission to the endpoints 102.

The substations 104 and the end points 102 communicate with each other over communications channels. Communications channels are portions of spectrum over which data are transmitted. The center frequency and bandwidth of each communications channel can depend on the communications system in which they are implemented. In some implementations, the communications channels for utility meters (e.g., power, gas and/or water meters) can be implemented in power line communication (PLC) networks that dynamically allocate available bandwidth according to an orthogonal frequency division multiple access (OFDMA) spectrum allocation technique or another channel allocation technique. (e.g., Time Division Multiple Access, Code Division Multiple Access, and other Frequency Division Multiple Access techniques).

In some implementations, the endpoints 102 can be configured to receive data from the ECAs 105 of the substations 104 over one or more "downstream" channels, while transmitting data to the substations 104 over a different "upstream" channel. For example, each of the endpoints 102 can be configured to receive "broadcast messages" (i.e., data that are intended to be received by all of the endpoints 102, or a proper subset thereof) on a same "downstream" channel as the other endpoints, while each individual endpoint (e.g., 102a) can be assigned a different "upstream" channel (as described above) over which the endpoint transmits data to the substation (e.g., 104a). As used throughout this document, a "downstream channel" is a channel over which data is transferred from a substation (or another network element) to an endpoint, while an "upstream channel" is a channel over which data is transferred from an endpoint to a substation (or another network element).

The data that are transmitted from the substations 104 to the endpoints 102 (i.e., downstream data) can include, for example, data that specify configuration settings for the endpoints 102, updated "upstream" or "downstream" communications channel assignments, synchronization data (e.g., timing synchronization information), and/or firmware updates.

The data that are transmitted from the endpoints 102 to the substations 104 (i.e., upstream data) can include, for example, reporting data that specify, for example, measures of total power consumption, power consumption over a specified period of time, peak power consumption, instantaneous voltage, peak voltage, minimum voltage and other measures of related to power consumption and power management (e.g., load information). Each endpoint (e.g., 102a) can also transmit status data that specify a status of the endpoint (e.g., operating in a normal operating mode, error mode, emergency power mode, or another state such as a recovery state following a power outage).

The status data that are transmitted by an endpoint (e.g., 102a) can also specify an endpoint identifier for the endpoint and/or a number (or rate) of symbol errors (or bit errors) that the endpoint has detected in data that are received from the substation 104. In some implementations, the endpoint identifier is inferred based on the channel over which the status data are received (e.g., when each endpoint is assigned to communicate over a unique channel). The status data can also specify a signal to noise measure for symbols that are being received by the endpoint 102, or other measures of transmission quality.

In some implementations, the data that are transmitted over the network 101 are formatted as symbols 106 (i.e., waveforms representing one or more bits and that persist on a communications channel for a fixed period of time). In some implementations, the symbols 106 are continuously or intermittently transmitted over a specified unit interval. A unit interval is a period of time over which a particular symbol is transmitted. A unit interval for each symbol can be less than or equal to the time interval (i.e., 1/update rate) at which updated data are required to be provided.

For example, assume that endpoint 102a is required to transmit updated status data to the substation 104a every 20 minutes (i.e., the specified update rate for the endpoint). In this example, the endpoint 102a can transmit a symbol representing a first set of updated status data for twenty minutes, and then transmit another symbol representing a next set of updated status data for a subsequent twenty minutes. The update rate and/or unit interval for an endpoint can be specified by a network administrator based, for example, on types and amounts of data that are being received from the endpoint, preferences of a customer (e.g., a power company) to whom the data are being provided, and/or channel characteristics of the channel over which the data are being transmitted. An update rate of 20 minutes is used for purposes of example, but other update rates (e.g., 1 minute, 5 minutes, 10 minutes, 1 hour, or 1 day) can be used.

The data that the substations 104 transmit downstream to the endpoints 102 can also be transmitted using symbols that are transmitted over unit intervals in a manner similar to that by which the endpoints transmit data to the substations 104. The unit interval over which a substation (e.g., 104a) transmits a symbol to the endpoints (e.g., 102a-102c) can be based, for example, on an amplitude at which the symbol is transmitted to the endpoints. For example, as the amplitude of a symbol is increased (e.g., relative to the noise floor of the channel over which the symbol is being transmitted), the time over which energy of the symbol must be accumulated in order to recover the symbol (e.g., with less than a threshold number of bit errors or less than a threshold bit error rate) generally decreases. Thus, symbols that are transmitted at higher amplitudes can generally be transmitted over shorter unit intervals than symbols that are transmitted at lower amplitudes. The bit error rates for symbols that are transmitted at higher amplitudes (e.g., relative to the noise floor) are also generally lower than the bit error rates for symbols that are transmitted at lower amplitudes. Thus, the reliability with which symbols are recovered by endpoints 102 generally increases as the amplitude at which the symbols that are transmitted by the substation 104 is increased (i.e., relative to the noise floor).

Although the reliability with which symbols are recovered by endpoints 102 can be increased by increasing the amplitude at which the symbols are transmitted, symbols that are transmitted at higher amplitudes are more likely to interfere with proper operation of neighboring endpoints (i.e., endpoints that are configured to communicate with a different substation). For example, assume that the network 101 is configured such that substation 104a is responsible for communicating with endpoints 102a-102c, while substation 104b is a neighboring substation (i.e., relative to substation 104a) that is responsible for communicating with neighboring endpoints 102d-102f. In this example, it is possible that as the amplitude of the transmissions from substation 104a is increased, that these transmissions will be recovered by one or more of the neighboring endpoints 102d-102f, such that these endpoints begin to communicate with substation 104a rather than substation 104b. Thus, the amplitude at which symbols are transmitted by a substation (e.g., 104a) are generally selected so that symbols are reliably recovered by endpoints (e.g., 102a-102c) with which the substation (e.g., 104a) is assigned to communicate, while limiting the likelihood that the transmissions will be recovered by neighboring endpoints.

The power at which a substation (e.g., 104a) transmits symbols to endpoints (e.g., 104a-104c) may need to be adjusted in response to changes in the load (e.g., the total impedance of the network elements) of the service network over time, as these changes can cause the amplitudes of the symbols that are received by the endpoints to change. For example, when additional endpoints are added to the network 101, the load of the network 101 may increase, and result in the amplitudes of the symbols received by the endpoints 102 are reduced. This reduction in amplitude may cause higher bit error rates for the endpoints 102, such that the reliability with which symbols being transmitted by the substation 104a are recovered decreases. Thus, it may be necessary to increase the output power of the ECA 105a that is transmitting the symbols to the endpoints 102a-102c in order to decrease the bit error rates and increase the reliability with which the symbols are recovered by the endpoints 102a-102c.

In another example, if one or more endpoints (or other network elements) are removed from the network, the load of the network 101 may be reduced. This load reduction can result in the amplitudes of the symbols being transmitted by substation 104a being recovered by the neighboring endpoints 102d-102f, such that the neighboring endpoints 102d-102f may begin communicating with substation 104a instead of substation 104b. In this example, it may be necessary to reduce the power at which substation 104a transmits symbols (or to increase the power at which substation 104b transmits symbols) so that the neighboring endpoints 102d-102f resume communications with substation 104b.

As described above, ECAs 105 can be configured to have a variable output amplifier that is capable of transmitting fundamental frequencies at various amplitudes. However, adjustments to the output amplitude of the ECA 105a (or ECA 105b) may require that a technician travel to the substation 104a (or 104b), and manually adjust the output amplitude of the ECA 105a. Thus, adjusting the output amplitude of the ECA 105a can be time consuming and/or resource intensive.

The environment 100 includes an amplitude regulation apparatus 120 that facilitates remote variation of the amplitudes at which symbols are transmitted over the network 101.

In some implementations, the amplitude regulation apparatus 120 adjusts the amplitude at which symbols are transmitted over the network 101 in response to receiving data that are indicative of a load change in the network 101.

For example, the network management apparatus 112 may receive from the substation 104a bit error rate data that specify a bit error rate measure (e.g., an average (or other measure of central tendency) bit error rate for a set of endpoints or individual bit error rates) that are being experienced by the endpoints 102a-102c, and provide this bit error rate data to the amplitude regulation apparatus 120. The amplitude regulation apparatus 120 determines whether the bit error rate measure exceeds a threshold bit error rate (e.g., a maximum acceptable bit error rate as specified by the network administrator). If the bit error rate exceeds the threshold bit error rate, then the amplitude regulation apparatus 120 can provide instructions to the substation 104a that cause the amplitude of the symbols being transmitted to the endpoints 102a-102c to be increased. As discussed with reference to FIG. 2, the amplitude of the symbols can be adjusted without adjusting an amplification factor of the ECA 105. Rather, the amplitude of the symbols can be varied by adjusting the fundamental frequency at which the ECA 105 transmits the symbols and/or the duty cycle of the waveforms that are used to generate the symbols.

In some implementations, instead of (or in addition to) providing the instructions described above to the substation 104a, the amplitude regulation apparatus 120 can provide alert data that cause presentation of an indication that the amplitudes of the symbols need adjustment. For example, the alert data can be provided to a user device 118 that is accessible by the administrator of the network 101. In turn, the amplitude regulation apparatus 120 can await feedback from the user device requesting that the amplitudes of the symbols be adjusted. Once the feedback is received, the amplitude regulation apparatus 120 can provide the substation 104a with instructions that cause the amplitude of the symbols to be adjusted without adjusting the amplitude of the fundamental frequency that is being output by the ECA 105.

The amplitude regulation apparatus 120 is depicted in FIG. 1 as being in communication with the network management apparatus 112. However, the amplitude regulation apparatus 120 can also be implemented as an element of the network management apparatus 112 or as an element of a substation (e.g., 104a). The amplitude regulation apparatus 120 can also be implemented to be in direct communication with one or more substations 104.

Figure 2:
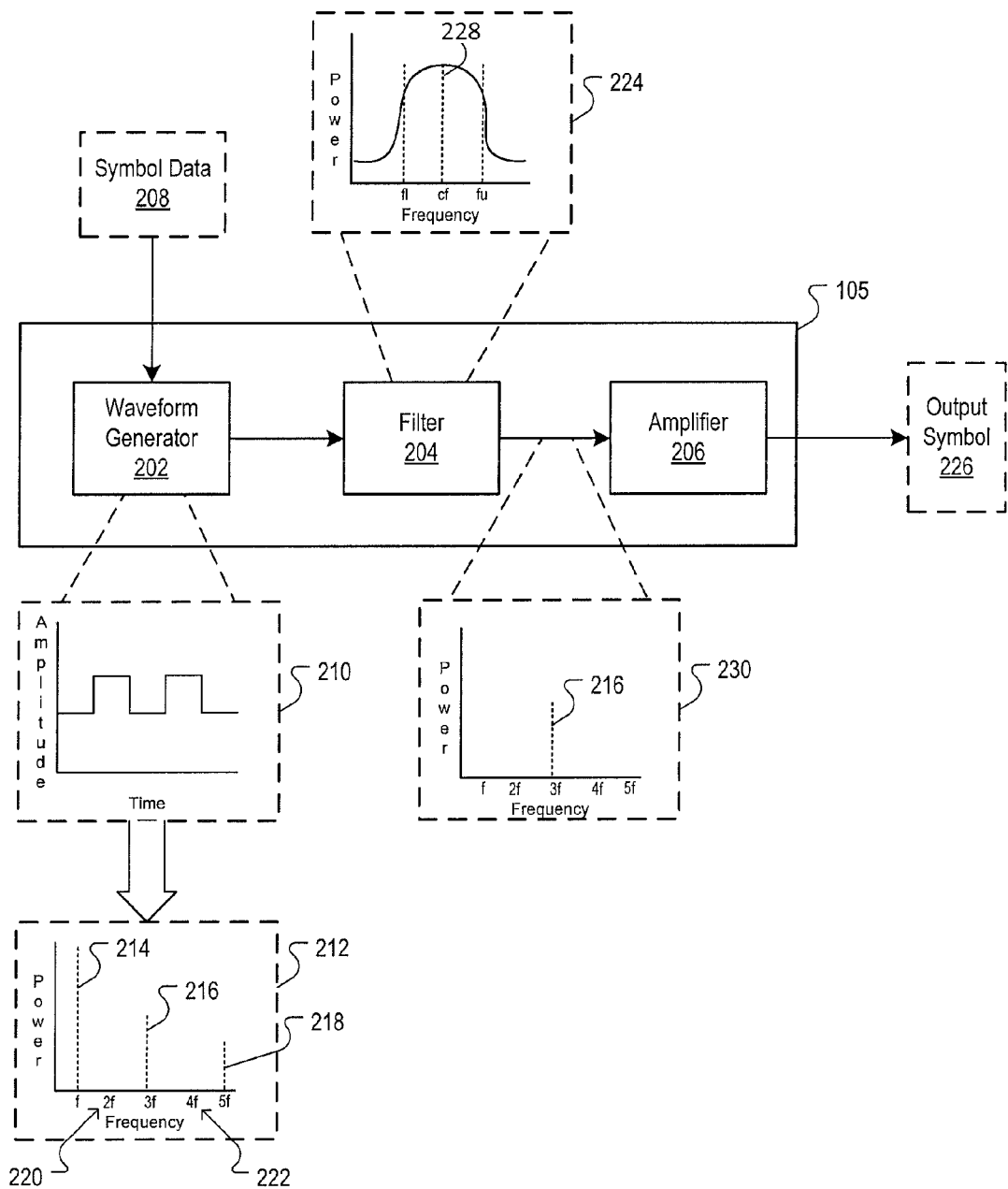
FIG. 2 is a block diagram of an example endpoint control apparatus and illustrates symbol amplitude adjustment.

FIG. 2 is a block diagram of an example ECA 105 and illustrates symbol amplitude adjustment. In some implementations, the ECA 105 includes a waveform generator 202, a filter 204, and an output amplifier 206. The configuration of the waveform generator 202, the filter 204, and the amplifier 206 are provided for purposes of illustration, and the ECA 105 can be implemented with different configurations. For example, the locations of the filter 204 and the amplifier 206 may be changed so that the output of the waveform generator 202 is output to the amplifier 206, and the output of the amplifier is then filtered using the filter 204.

As described above, the waveform generator 202 can be configured to generate a variety of different waveform shapes at a range of fundamental frequencies. For example, the waveform generator 202 can be configured to generate a square wave having fundamental frequencies between 50 Hz and 10,000 Hz. The waveform generator 202 can also be configured to generate waveforms having various different duty cycles (e.g., waveforms having duty cycles ranging from 10% to 90%).

The waveforms that are output by the waveform generator 202 are waveforms in which symbol data 208 are encoded. The symbol data 208 can be data such as updated communications channel assignments, synchronization data, and/or updated firmware that is to be provided to the endpoints to which the ECA 105 is assigned.

As illustrated by FIG. 2, the waveforms that are used to represent the symbol data 208 can be a set of square waves 210. If the set of square waves 210 have a 50% duty cycle, then the set of square waves 210 will have a harmonic spectrum that includes non-zero spectral components for the fundamental frequency of the set of square waves and odd harmonics of the fundamental frequency, as illustrated by spectral graph 212. For example, according to the spectral graph 212, the fundamental frequency 214 is the spectral component having the highest power, while the third harmonic 216 is a lower power spectral component than the fundamental frequency 214, and the fifth harmonic 218 is a lower power spectral component than the third harmonic. Meanwhile, the second harmonic 220 and the fourth harmonic 222 (as well as other even harmonics) will be zero amplitude spectral components.

The ECA 105 includes a filter 204 that restricts the spectral components that are transmitted to the endpoints. In some implementations, the filter is a bandpass filter that restricts the spectral components that are transmitted to the endpoints to those spectral components that are included in the "pass-band" of the filter (e.g., as defined by an upper cutoff frequency ("fu") and a lower cutoff frequency ("fl")). As illustrated by filter response graph 224, when the filter 204 is implemented in as a bandpass filter, the center frequency ("cf") 228 of the pass-band (e.g., relative to the upper and lower cutoff frequencies) may be within a threshold spectral distance of the center frequency of the channel over which the ECA 105 communicates with the endpoints.

For example, if the endpoints are configured to communicate with the ECA 105 over a channel that is centered at 400 Hz, then the filter 204 can be configured to have a center frequency 228 of 400 Hz. Assuming, for purposes of example, that the pass-band of the filter is 30 Hz, the upper cutoff frequency will be 415 Hz, and the lower cutoff frequency will be 385 Hz, such that spectral components higher than 415 Hz or less than 385 Hz will be substantially filtered from transmission to the endpoints. Thus, if the fundamental frequency 214 is between 385 Hz and 415 Hz, then the fundamental frequency 214 will be transferred to the amplifier at substantially the same power as was output by the waveform generator 202. However, in this example, higher-order harmonics (e.g., 2nd, 3rd, 4th, and 5th harmonics) of the fundamental frequency 214 will be substantially attenuated (e.g., will have substantially zero amplitude) in the output from the filter 204.

The amplifier 206 receives the filtered waveforms from the filter 204, and amplifies the filtered waveforms to generate an output symbol 226 that is transmitted over the network to the endpoints. The amplifier 206 can be adjusted to vary the amplitude of the output symbols. However, the amplifier 206 may be configured such that remote amplitude adjustment may be difficult. For example, the amplifier may have a mechanical switch that is required to be toggled in order to select an amplification factor for the amplifier. In another example, instructions required to remotely adjust the amplification factor of the amplifier may be difficult to transmit to an amplifier that is located at a power substation. Therefore, adjustment of the amplification factor for the amplifier 206 may require a technician to visit the substation at which the amplifier 206 is installed.

As discussed above, the waveform generator 202 may be capable of transmitting waveforms within a range of different fundamental frequencies and having a range of selectable duty cycles. Because each of these waveforms have known harmonic spectral components, that each have known amplitudes (i.e., relative to the amplitude of the fundamental frequency), it is possible to adjust the amplitude of output symbols 226 by adjusting the fundamental frequency 214 and/or duty cycle of the waveforms that are output by the waveform generator 202.

For example, assume that the filter 204 has a pass-band of 385 Hz-415 Hz and that the waveform generator 202 initially outputs a square wave having a 50% duty cycle and fundamental frequency of 400 Hz. As described above, the 400 Hz fundamental frequency will pass through the filter 204, and be amplified by the amplifier 206 to generate output symbols 226. Now assume that the load of the network is reduced, such that the amplitude of the output symbols 226 needs to be reduced to prevent interference with neighboring endpoints. In this example, the fundamental frequency being output by the waveform generator 202 can be reduced to lower the amplitude of the output symbols 226 (assuming that the amplifier 206 is not adjusted).

In a particular example, if the fundamental frequency 214 being output by the waveform generator 202 is adjusted to be 133.33 Hz, the fundamental frequency 214 will no longer pass through the filter 204 since 133.33 Hz is not within the pass-band of the filter 204. However, the third harmonic 216 of the fundamental frequency 214 (e.g., ~400 Hz), will now pass through the filter 204, as illustrated by the spectral graph 230, while all higher harmonics (e.g., 5th, 7th, and 9th harmonics) will be filtered by the filter 204. Thus, the amplitude of the filtered waveform will be the amplitude of the 3rd harmonic, which in this example, will be approximately ⅓ the amplitude of the fundamental frequency. Thus, if the amplification factor of the amplifier 206 is maintained constant, the amplitude of the output symbol 226 will be reduced by ~66% by adjusting the fundamental frequency 214 so that the 3rd harmonic passes through the filter 204. Further amplitude reduction can be achieved by adjusting the fundamental frequency 214 so that higher harmonics (i.e., harmonics greater than the 3rd harmonic) are passed through the filter 204.

Instead of (or in addition to) changing the fundamental frequency, the amplitude of output symbols 226 can be adjusted by adjusting the duty cycle of the waveforms that are output by the waveform generator 202. For example, assuming that the fundamental frequency remains the same, the amplitude of the output symbols 226 can be reduced by approximately 30% by adjusting the duty cycle of the waveforms from 50% to 25%. Similarly, changing the duty cycle of the fundamental frequency from 50% to 17% will result in an amplitude reduction of approximately 50%.

As the duty cycle of the waveforms is adjusted, the amplitudes of the harmonics also vary, such that changes in both the duty cycle and fundamental frequency can be used to change the amplitude of output symbols 226. For example, the amplitude of the output symbols 226 can be reduced by approximately 50% by adjusting the duty cycle from 50% to 25% and adjusting the fundamental frequency such that only the second harmonic passes through the filter 204.

Power line communications systems are three phase communications environments. In some implementations, fundamental frequency selection and/or duty cycle selection can be made on a per-phase basis, for example, based on the communications performance that is being observed on each phase. For example, if communications errors are only occurring in a single phase of the network, the fundamental frequency used to communicate in that phase may be adjusted while the fundamental frequencies used to communicate over the other two phases are not adjusted.

Additionally, because PLC networks are three phase environments, the phase difference between the waveforms that represent the symbols may need to be adjusted when the fundamental frequencies are adjusted. For example, when the same fundamental frequency passes through the filter 204 for each phase of the network, the phase difference between the waveforms that are generated by the waveform generator 202 will generally be 120 degrees. Assume that the fundamental frequency on each phase is adjusted such that the third harmonic of the fundamental frequency is being passed through the filter, and transmitted to the endpoints. In this example, the phase difference between the waveforms that are generated by the waveform generator 202 should be 40 degrees, because the phase difference between the third harmonics that will be transmitted to the endpoints will be 120 degrees.

In some implementations, the ECA 105 may also generate additional spectral components at known spectral offsets ("offset spectral components"). For example, in a typical PLC network, the ECA 105 may also generate an offset spectral component that is 120 Hz away from the fundamental frequency. In a particular example, if the waveform generator 202 is outputting a 50% duty cycle square wave at 300 Hz, the offset spectral component will be located at 420 Hz. This offset spectral component may have known amplitude characteristics relative to the amplitude of the fundamental frequency, such that this offset spectral component may be used to vary symbol amplitude in a manner similar to that by which the harmonic spectral components are used.

Figure 3:
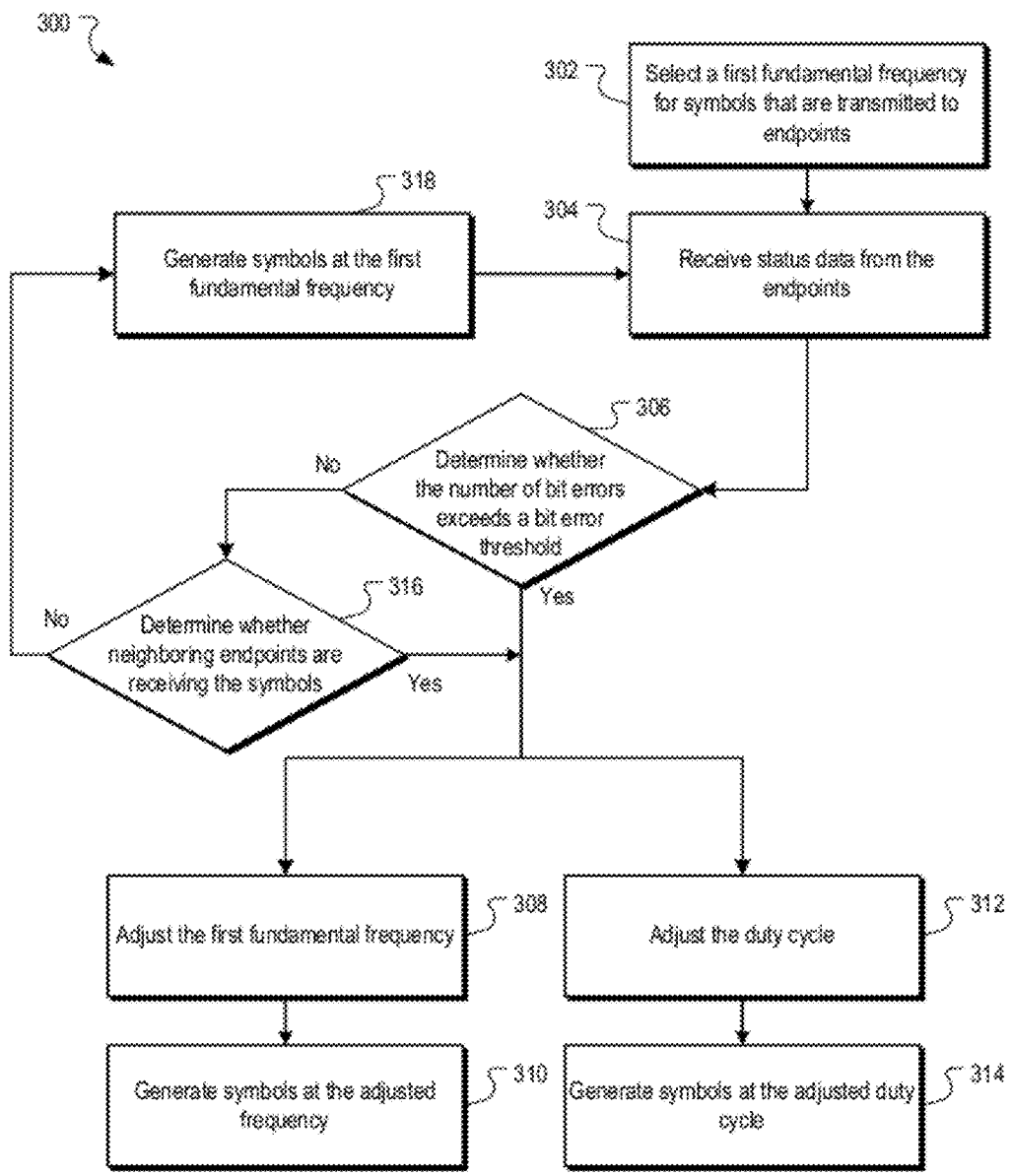
FIG. 3 is a flow chart of an example process for varying symbol amplitude.

FIG. 3 is a flow chart of an example process 300 for varying symbol amplitude. The process 300 is a process by which a first fundamental frequency is selected for symbols that are transmitted to endpoints in a communications network. Status data are received from the endpoints, and a determination is made based on the status data whether the number of bit errors being detected by the endpoints exceeds a threshold number of bit errors. In response to the determining that the number of bit errors exceeds the threshold number of bit errors, the first fundamental frequency is adjusted, and symbols are generated at the adjusted frequency.

The process 300 can be implemented, for example, by the amplitude regulation apparatus 120, the substations 104, and/or the network management apparatus 112 of FIG. 1. In some implementations, a data processing apparatus includes one or more processors that are configured to perform actions of the process 300. In other implementations, a computer readable medium can include instructions that when executed by a computer cause the computer to perform actions of the process 300.

A first fundamental frequency is selected for symbols that are transmitted to endpoints in a communications system (302). The first fundamental frequency is selected so that a baseline harmonic of the first fundamental frequency is within a downstream channel over which data are transferred from a substation to the endpoints. In some implementations, the first fundamental frequency is selected so that the baseline harmonic is a second harmonic (or a higher order harmonic) of the fundamental frequency.

For example, assume that the downstream channel has a center frequency of 400 Hz. In this example, the first fundamental frequency can be selected to be 133.33 Hz so that the third harmonic of the first fundamental frequency (i.e., 3*133.33 Hz) is substantially equal to the center frequency of the downstream channel. As described with reference to FIG. 2, if a bandpass filter is used to restrict the spectral components that are transmitted to the endpoints, this bandpass filter can have a pass-band that includes the spectrum that defines the downstream channel. Continuing with the example above, if the downstream channel has a channel bandwidth of 30 Hz, then the bandpass filter can have a pass-band of 30 Hz that is centered at 400 Hz. In this example, only the third harmonic of the first fundamental frequency will pass through the bandpass filter for transmission to the endpoints.

In some implementations, the first fundamental frequency can be selected to be the highest fundamental frequency at which fewer than a threshold number of neighboring endpoints are receiving the symbols, and at which a harmonic of the fundamental frequency is within the downstream channel. For example, the symbols can initially be generated at an initial fundamental frequency that is within the downstream channel. These symbols can be amplified at a first amplification factor (e.g., using a maximum amplitude multiplier), and transmitted to the endpoints.

When the symbols have an initial fundamental frequency that is within the downstream channel and are transmitted at maximum power, it is likely that each of the nodes with which an endpoint is assigned to communicate will accurately receive the symbols. However, it is also possible that neighboring endpoints (i.e., endpoints with which the substation is not assigned to communicate) will also receive the symbols, which may interfere with proper communications between the neighboring endpoints and a neighboring substation with which the neighboring endpoints should be communicating.

In some implementations, data indicative of the number of neighboring nodes that are receiving the symbols is received. The data may specify that the number of neighboring endpoints with which a neighboring substation is communicating has decreased relative to a total number of neighboring endpoints with which the neighboring substation is assigned to communicate. If the number of neighboring endpoints that are in communication with the neighboring substation has decreased more than a threshold amount (e.g., an absolute number of neighboring endpoints or a percentage of the total neighboring endpoints), it can be determined that the amplitude at which the symbols are being transmitted should be reduced.

For example, if the data specify that the number of neighboring endpoints with which the neighboring substation is communicating has decreased from 45 to 30, it may be assumed that 15 neighboring endpoints are receiving the symbols. Assume for this example that the amplitude of the symbols should be reduced if it is determined that more than 5 neighboring nodes are receiving the symbols. Thus, in this example, the amplitude of the symbols should be reduced.

In response to determining that the amplitude at which the symbols are being transmitted should be reduced, the initial fundamental frequency can be reduced to a reduced frequency at which a harmonic (e.g., second or higher order harmonic) of the reduced frequency is within the downstream channel. Assuming that fewer than all harmonics (e.g., only one harmonic) of the reduced frequency are within the downstream channel (and/or a pass-band of a filter such as the filter 204 of FIG. 2), the amplitude of the symbol being transmitted over the downstream channel will be reduced relative to the amplitude of the symbol for which the fundamental frequency was within the downstream channel. Thus, the symbol will be received by fewer neighboring endpoints.

Data indicative of the number of neighboring nodes that are receiving the symbols can again be received, and the number of neighboring endpoints that are communicating with the neighboring substation can again be analyzed to determine whether the number of neighboring nodes that are receiving the symbols is within an acceptable range (e.g., less than a threshold number of neighboring nodes). If the number of neighboring nodes that are receiving the symbols is not within the acceptable range, the reduced frequency can be reduced further, as described above. If the number of neighboring nodes that are receiving the symbols is within the acceptable range, the reduced frequency can be selected as the first fundamental frequency that will be used to generate the symbols. The symbols that are generated at the first fundamental frequency can be filtered, as described with reference to FIG. 2, and amplified using the first amplification factor prior to being transmitted to the endpoints. The filtered and amplified symbols that are generated at the first fundamental frequency will have lower amplitude than the symbols that were generated at the initial fundamental frequency, as described with reference to FIG. 2. Thus, fewer neighboring endpoints will receive the symbols.

Status data are received from the endpoints (304). In some implementations, the status data for each endpoint specify a number of bit errors that have been detected by the endpoint. For example, each endpoint can be configured to compute a bit error rate (or a symbol error rate) for the symbols using, for example, forward error correction techniques or other data verification techniques. The endpoints can transmit this data back to the substation from which the symbol was received to provide the substation with an indication of transmission quality.

In some implementations, the identity of an endpoint from which the status data are received is determined based on a channel over which the status data were received. For example, each endpoint can be assigned a separate upstream channel over which the endpoint is to transmit data to the substation. The substation can maintain an index of upstream channels and an identifier for the endpoint that has been assigned to communicate with the substation over each of the upstream channels. Thus, when the substation receives status data over a particular channel, the substation can determine, based on the index, the identity of the endpoint that transmitted the status data.

In some implementations, the status data include data that are indicative of endpoint identity. For example, the status data can include data specifying a unique identifier (e.g., a serial number or another unique identifier) with which the identity of the endpoint can be determined. The unique identifier can be compared to a set of unique identifiers for endpoints with which the substation has been assigned to communicate. In turn, the status data that specify unique identifiers that are included in the set of unique identifiers can be determined to have been received from endpoints with which the substation is assigned to communicate. The status data that specify unique identifiers that are not included in the set of unique identifiers for the substation can be determined to be from neighboring endpoints.

A determination is made whether the status data that are received from at least a threshold number of the endpoints specify a number of bit errors (e.g., an absolute number of bit errors or a bit error rate) that exceeds a threshold number of bit errors (306). The threshold number of bit errors can be specified, for example, by a network administrator based on the maximum number of bit errors that can occur while still recovering the symbols with at least a specified level of confidence. The threshold number of endpoints can similarly be specified by the network administrator based, for example, on an analysis of historical bit error data. For example, the network administrator may determine, based on historical data, that symbol amplitude is not a significant contributor to bit errors unless at least 20% of the endpoints are reporting bit error rates that exceed a threshold bit error rate. In this example, the network administrator may set the threshold number of endpoints to be 20% of the endpoints.

In some implementations, the threshold number of endpoints can be specified as a number of all endpoints from which status data are received. Alternatively, the threshold number of endpoints can be specified as a number of only those endpoints that have been identified (e.g., based on the status data or channel assignments) to be endpoints with which the substation has been assigned to communicate.

In response to determining that at least the threshold number of endpoints is reporting a bit error rate that exceeds the threshold bit error rate, the first fundamental frequency is adjusted to a second fundamental frequency that is higher than the first fundamental frequency (308). In some implementations, the second fundamental frequency is a frequency at which a lower order harmonic relative to the baseline harmonic is within the downstream channel. As described with reference to FIG. 2, the amplitude of the lower order harmonic will be higher than the amplitude of the baseline harmonic. Thus, the amplitude of the symbol can be increased by generating symbols at the second fundamental frequency (310), and transmitting the lower order harmonic rather than at the baseline harmonic.

In some implementations, the amplitude of the symbol can also be increased by adjusting the duty cycle of the waveforms that are used to represent the symbols (312). For example, assume that a square wave at the first fundamental frequency is being used to represent the symbols and that the square wave has a duty cycle of 25%. In this example, if the duty cycle of the square wave is increased to 50%, the amplitude of the symbols can be increased by approximately 30%. Thus, when at least the threshold number of endpoints is reporting a bit error rate that exceeds the threshold bit error rate, the duty cycle can be increased, and symbols can be generated using the increased duty cycle (314).

As discussed above, adjusting either the first fundamental frequency or the duty cycle can result in changes to symbol amplitude. In some implementations, both the first fundamental frequency and the duty cycle are adjusted to achieve various symbol amplitudes between 100% of the amplitude of the first fundamental frequency, and 0% of the first fundamental frequency. For example, Table 1 provides example symbol amplitudes that can be realized by adjusting the first fundamental frequency and/or the duty cycle of a square wave that is used to represent the symbols.

TABLE 1

| Duty Cycle | Spectral Component That is Within the Downstream Channel | Symbol Amplitude (relative to amplitude of fundamental frequency) |
| --- | --- | --- |
| 50% | Fundamental Frequency | ~100% |
| 25% | Fundamental Frequency | ~70% |
| 17% | Fundamental Frequency | ~50% |
| 25% | Second Harmonic | ~50% |
| 50% | Second Harmonic | ~0% |
| 50% | Third Harmonic | ~33% |

Other combinations of duty cycle and fundamental frequency can be used to achieve other symbol amplitudes. For example, a symbol amplitude of ~30% of the fundamental frequency may be achieved by first adjusting the fundamental frequency at which a second harmonic of the fundamental frequency is within the downstream channel, and decreasing the duty cycle until the symbol amplitude is approximately 30% of the amplitude of the fundamental frequency (e.g., at approximately 40% duty cycle).

The load of a power line communications network (or another communications network) can change over time. Therefore, the amplitude at which symbols are transmitted may need to be adjusted over time to ensure that the symbols are being accurately recovered by the endpoints for which the symbols are intended, while not interfering with the operation of neighboring endpoints. For example, the load may continue to increase such that a threshold number of the endpoints are again determined to be experiencing bit error rates that exceed a threshold bit error rate (306). In response to this determination, the fundamental frequency can again be adjusted (312), as described above, to increase the amplitude at which the symbols are transmitted though the network.

The network load may also decrease, which can increase the likelihood that neighboring nodes will begin receiving the symbols (assuming constant symbol amplitude), such that the symbols may interfere with proper operation of the neighboring nodes. Thus, it may be necessary to decrease the amplitude at which the symbols are transmitted through the network. Returning again to step 306, if it is determined that fewer than the threshold number of endpoints is reporting a bit error rate that exceeds the threshold bit error rate, a determination can be made whether a threshold number of neighboring endpoints are receiving the symbols (316), as described above. For example, the determination can be based on a determination that status data are being received from at least the threshold number of neighboring endpoints, or receiving data indicative of a number of neighboring endpoints that are receiving the symbols.

If the threshold number of neighboring endpoints are determined to not be receiving the symbols, symbols can continue to be generated at the first fundamental frequency (318), and status data can continue to be received from the endpoints (304). However, if the threshold number of neighboring endpoints are determined to be receiving the symbols, the amplitude of the symbols that are transmitted can be reduced by adjusting the first fundamental frequency to a lower frequency and/or adjusting the duty cycle of the waveforms that represent the symbols in a manner similar to that described above. In some implementations, the fundamental frequency and/or the duty cycle can be adjusted until the symbol amplitude is within a target amplitude range (e.g., 27%-30%) relative to the amplitude of the fundamental frequency.

Figure 4:
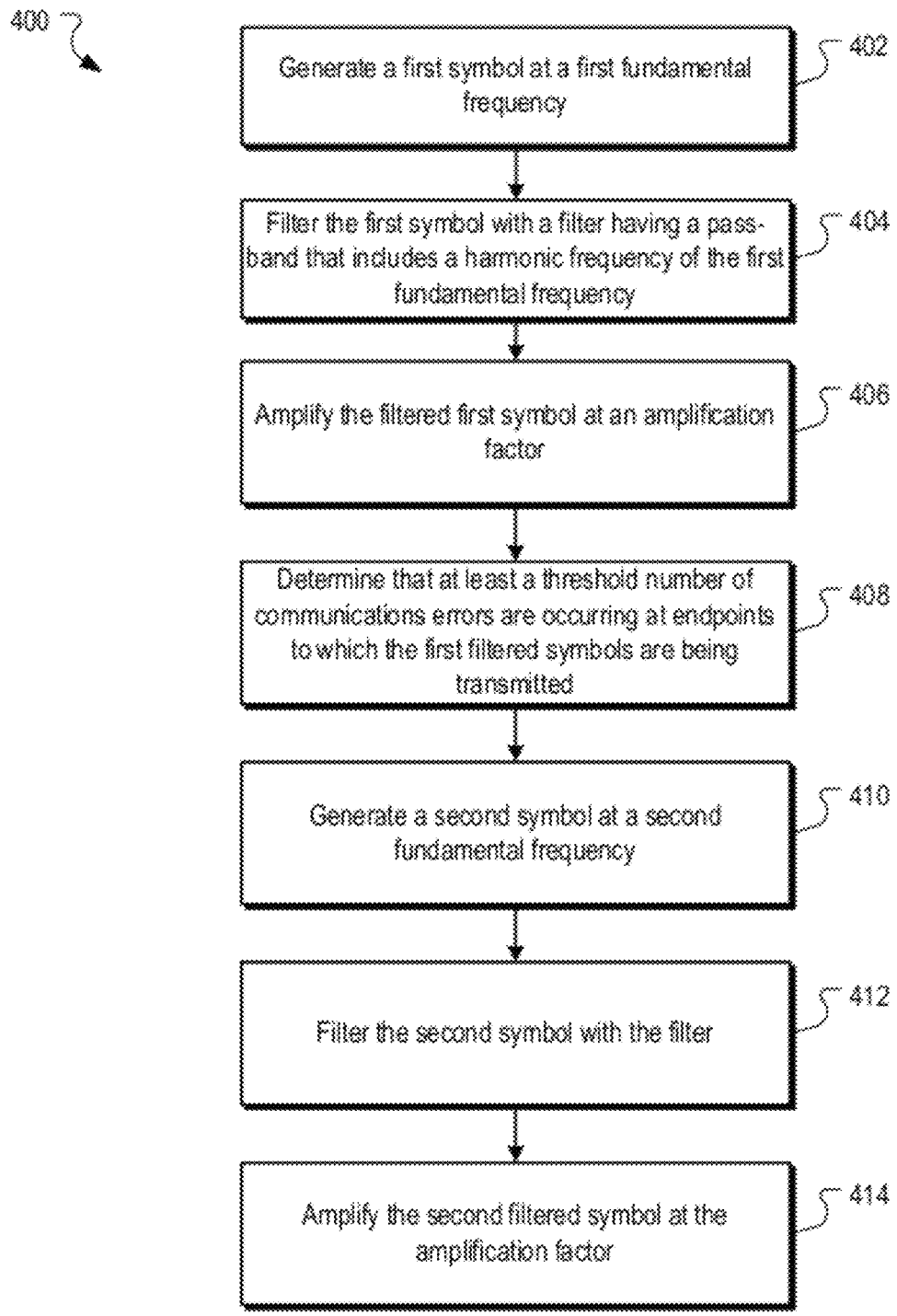
FIG. 4 is a flow chart of another example process for varying symbol amplitude.

FIG. 4 is a flow chart of another example process 400 for varying symbol amplitude. The process 400 is a process by which a first symbol having a first fundamental frequency is passed through a filter having a pass-band that includes a harmonic frequency of the first fundamental frequency. The filtered signal is amplified at an amplification factor, and a determination is made that at least a threshold number of communications errors are occurring at endpoints to which the filtered symbols are being transmitted. In response to this determination, a second symbol having a second fundamental frequency is generated, passed through the filter, and amplified at the amplification factor.

The process 400 can be implemented, for example, by the amplitude regulation apparatus 120, the substations 104, and/or the network management apparatus 112 of FIG. 1. In some implementations, a data processing apparatus includes one or more processors that are configured to perform actions of the process 400. In other implementations, a computer readable medium can include instructions that when executed by a computer cause the computer to perform actions of the process 400.

A first symbol is generated at a first fundamental frequency (402). In some implementations, the first symbol is generated using a square wave that has the first fundamental frequency, as described above. The first symbol can be generated, for example, by the waveform generator 202 of FIG. 2.

The first symbol is filtered with a filter having a pass-band that includes a harmonic frequency of the first fundamental frequency (404). For example, assuming that the first fundamental frequency is selected in a manner similar to that described with reference to FIG. 3, the filter can have a pass-band that includes the downstream channel over which a substation communicates with endpoints, such that a harmonic of the fundamental frequency passes through the filter, and is transmitted to the endpoints.

The filtered symbol is amplified at an amplification factor (406). For example, as described above, the filtered symbol can be passed through an amplified, such as the amplifier 206, of FIG. 2. The amplifier can be set to amplify the symbol at a particular amplification factor (e.g., a maximum amplification factor for the amplifier), such that the amplitude of the symbol that is output from the amplifier is greater than the amplitude of the symbol that is input to the amplifier.

The amplified symbol is transmitted over the downstream channel to the endpoints, and a determination is made that at least a threshold number of communications errors are occurring at the endpoints to which the symbols are being transmitted (408). The communications can include, for example, bit errors that are being experienced by endpoints, as well as receipt of the symbols by neighboring endpoints, as described above.

In response to determining that the threshold number of communications errors are occurring, a second symbol is generated at a second fundamental frequency (410). The second symbol can include the same (or different) data relative to the first symbol. However, the second fundamental frequency will differ from the first fundamental frequency. As described above, the second fundamental frequency will be a frequency for which a harmonic of the second fundamental frequency is within the pass-band of the filter.

The second symbol is filtered with the filter (412), and amplified at substantially the same amplification factor as the first symbol (414).

Figure 5:
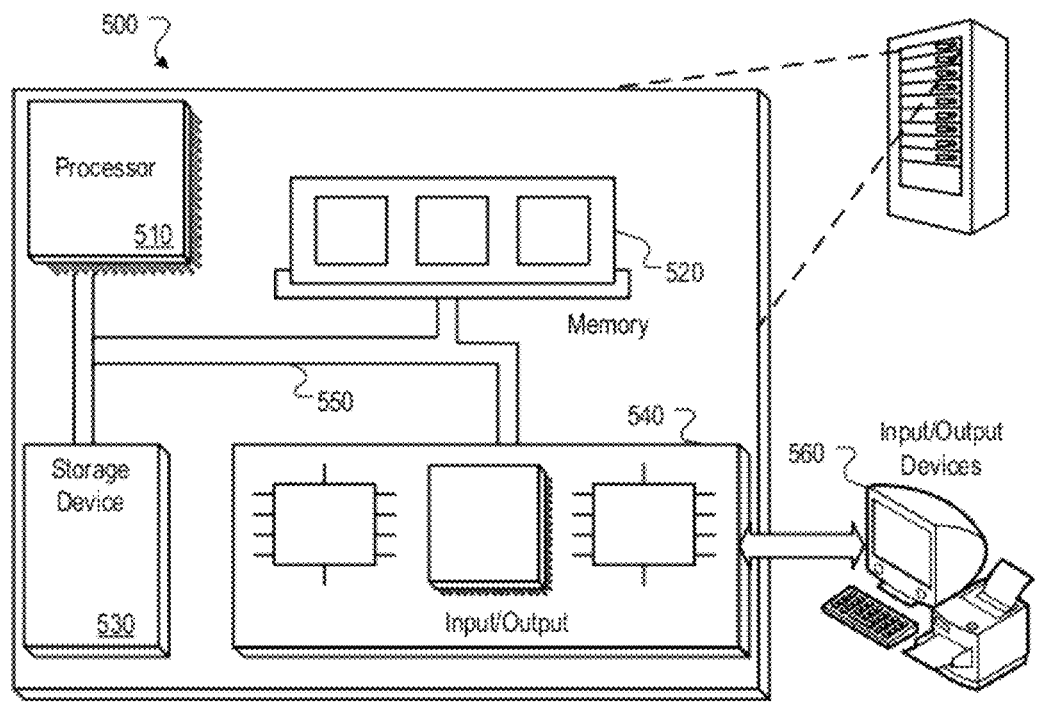
FIG. 5 is a block diagram of an example system that can be used to facilitate symbol amplitude variation.

FIG. 5 is a block diagram of an example system 500 that can be used to facilitate symbol amplitude variation, as described above. The system 500 includes a processor 510, a memory 520, a storage device 530, and an input/output device 540. Each of the components 510, 520, 530, and 540 can be interconnected, for example, using a system bus 550. The processor 510 is capable of processing instructions for execution within the system 500. In one implementation, the processor 510 is a single-threaded processor. In another implementation, the processor 510 is a multi-threaded processor. The processor 510 is capable of processing instructions stored in the memory 520 or on the storage device 530.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 can include, for example, a hard disk device, an optical disk device, or some other large capacity storage device.

The input/output device 540 provides input/output operations for the system 500. In one implementation, the input/ output device 540 can include one or more of a network interface device, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 560. Other implementations, however, can also be used, such as mobile computing devices, mobile communication devices, set-top box television client devices, etc.

Although an example processing system has been described in FIG. 5, implementations of the subject matter and the functional operations described in this specification can be implemented in other types of digital electronic circuitry, or in computer software, firmware, or hardware, including the structures disclosed in this specification and their structural equivalents, or in combinations of one or more of them.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
    a symbol generator including:
        a waveform generator configured to output waveforms at a plurality of selectable fundamental frequencies and with a selectable duty cycle; and
        a bandpass filter having a pass-band that is within a communications channel of a communications network;
    data processing apparatus operable to interact with the symbol generator and to perform operations including:
        determining that at least a threshold number of endpoints that receive symbols from the symbol generator are experiencing a same type of transmission error; and
        in response to the determination, causing the waveform generator to adjust at least one of the fundamental frequency or a duty cycle of the waveforms, wherein the fundamental frequency is adjusted to a frequency having a harmonic that is within the pass-band.

2. The system of claim 1, wherein the data processing apparatus is further operable to perform operations including:
    receiving transmission quality data specifying a bit error rate as for symbols that were generated by the symbol generator and received by the endpoints, wherein
    determining that at least a threshold number of endpoints are experiencing a same type of transmission error comprises determining that at least the threshold number of endpoints are detecting a bit error rate that exceeds a threshold bit error rate.

3. The system of claim 2, wherein the data processing apparatus is operable to adjust at least one of the fundamental frequency or a duty cycle by being configured to cause the waveform generator to increase the fundamental frequency in response to determining that at least the threshold number of endpoints are detecting the bit error rate that exceeds the threshold bit error rate.

4. The system of claim 3, wherein the data processing apparatus is operable to cause the waveform generator to adjust at least one of the fundamental frequency or a duty cycle by being configured to cause the waveform generator to increase both the fundamental frequency and the duty cycle in response to determining that at least the threshold number of endpoints are detecting the bit error rate that exceeds the threshold bit error rate.

5. The system of claim 2, wherein the data processing apparatus is operable to cause the waveform generator to adjust at least one of the fundamental frequency or a duty cycle by being configured to cause the waveform generator to increase the duty cycle in response to determining that at least the threshold number of endpoints are detecting the bit error rate that exceeds the threshold bit error rate.

6. The system of claim 1, wherein the data processing apparatus is further operable to perform operations including:
    receiving transmission quality data specifying that a number of neighboring endpoints with which a neighboring substation is communicating has decreased relative to a number of neighboring endpoints with which the neighboring substation is assigned to communicate, wherein
    determining that at least a threshold number of endpoints are experiencing a same type of transmission error comprises determining that at least the threshold number of neighboring endpoints with which the neighboring endpoints are communicating has decreased more than a threshold amount.

7. The system of claim 6, wherein the data processing apparatus is operable to cause the waveform generator to adjust at least one of the fundamental frequency or a duty cycle by being configured to cause the waveform generator to decrease the fundamental frequency in response to determining that at least the threshold number of neighboring endpoints with which the neighboring endpoints are communicating has decreased more than a threshold amount.

8. The system of claim 7, wherein the data processing apparatus is operable to cause the waveform generator to adjust at least one of the fundamental frequency or a duty cycle by being configured to cause the waveform generator to decrease both the fundamental frequency and the duty cycle in response to determining that at least the threshold number of neighboring endpoints with which the neighboring endpoints are communicating has decreased more than a threshold amount.

9. The system of claim 5, wherein the data processing apparatus is operable to cause the waveform generator to adjust at least one of the fundamental frequency or a duty cycle by being configured to cause the waveform generator to decrease the duty cycle in response to determining that at least the threshold number of neighboring endpoints with which the neighboring endpoints are communicating has decreased more than a threshold amount.

10. A method performed by data processing apparatus, the method comprising:
    selecting a first fundamental frequency for symbols that are transmitted to endpoints in a communications system, the first fundamental frequency being selected so that a baseline harmonic of the first fundamental frequency is within a downstream channel over which data are transferred from a substation to the endpoints, the baseline harmonic being at least a second harmonic of the first fundamental frequency;

receiving status data from the endpoints, the status data for each endpoint specifying a number of bit errors that have been detected by the endpoint;
determining that the status data from at least a threshold number of the endpoints specify a number of bit errors that exceeds a threshold number of bit errors; and
adjusting the first fundamental frequency to a second fundamental frequency that is higher than the first fundamental frequency, the second fundamental frequency being a frequency at which a lower harmonic than the baseline harmonic is within the downstream channel.

11. The method of claim 10, wherein:
receiving status data further comprises receiving, from each of the endpoints, status data that are indicative of endpoint identity; and
determining that status data from at least a threshold number of the endpoints specify a number of bit errors that exceeds a threshold number of bit errors comprises:
identifying, based on the status data, the endpoints with which the substation is assigned to communicate; and
determining that the status data for at least the threshold number of the identified endpoints specify a number of bit errors that exceeds the threshold number of bit errors.

12. The method of claim 11, wherein identifying the endpoints with which the substation is assigned to communicate comprises identifying the endpoints having unique identifiers that are included in a set of network identifiers for endpoints with which the substation is assigned to communicate.

13. The method of claim 10, further comprising:
determining that status data are being received from at least a threshold number of neighboring endpoints, each neighboring endpoint being an endpoint with which the substation is not assigned to communicate; and
adjusting the first fundamental frequency to a third fundamental frequency, the third fundamental frequency being a frequency at which a higher harmonic than the baseline harmonic is within the downstream channel.

14. The method of claim 13, wherein determining that status data are being received from at least the threshold number of neighboring endpoints comprises:
receiving data indicating that a number of endpoints with which a neighboring substation is communicating has decreased relative to a number of endpoints with which the neighboring substation is assigned to communicate; and
determining that the number of endpoints with which the neighboring substation is communicating has decreased more than a threshold amount.

15. The method of claim 10, further comprising:
transmitting the symbols to the endpoints, the symbols having an initial fundamental frequency that is within the downstream channel and being transmitted at a first amplification factor; and
determining that at least a threshold number of neighboring endpoints are receiving the symbols, each neighboring endpoint being an endpoint with which the substation is not assigned to communicate, wherein
selecting the first fundamental frequency comprises:
reducing the initial fundamental frequency to a reduced frequency at which a harmonic of the reduced frequency is within the downstream channel;
determining that the symbols are being received from fewer than the threshold number of neighboring endpoints; and
selecting the reduced frequency to be the first fundamental frequency.

16. The method of claim 15, further comprising transmitting the symbols to the endpoints at the first amplification factor, the symbols being generated at the first fundamental frequency.

17. The method of claim 10, further comprising following adjustment of the first fundamental frequency, adjusting a duty cycle of the second fundamental frequency until an amplitude of the symbol is within a target amplitude range.

18. A method performed by data processing apparatus, the method comprising:
transmitting symbols from a substation to endpoints in a communications network, the symbols being transmitted at a first frequency and amplified at an amplification factor, the first frequency being a harmonic of a fundamental frequency for the symbols, the harmonic being within a downstream channel over which the substation communicates with the endpoints;
receiving transmission quality data specifying a measure of transmission quality for the symbols;
determining that at least a threshold number of endpoints in the communications network are experiencing a same type of transmission error;
adjusting the fundamental frequency based on the type of transmission error, the fundamental frequency being adjusted so that a different harmonic of the adjusted fundamental frequency is within the downstream channel; and
transmitting the symbols over the downstream channel, the symbols being generated at the fundamental frequency and amplified at the amplification factor.

19. A method performed by data processing apparatus, the method comprising:
generating a first symbol at a first fundamental frequency;
filtering the first symbol with a filter having a pass-band that includes a harmonic frequency of the first fundamental frequency;
amplifying the filtered first symbol at an amplification factor;
determining that at least a threshold number of communications errors are occurring at endpoints to which the first filtered symbols are being transmitted;
generating a second symbol at a second fundamental frequency that is different than the first fundamental frequency, the second fundamental frequency having a harmonic that is within the pass-band;
filtering the second symbol with the filter; and
amplifying the second filtered symbol at the amplification factor.

20. A non-transitory computer storage medium encoded with a computer program, the program comprising instructions that when executed by data processing apparatus cause the data processing apparatus to perform operations comprising:
selecting a first fundamental frequency for symbols that are transmitted to endpoints in a communications system, the first fundamental frequency being selected so that a baseline harmonic of the first fundamental frequency is within a downstream channel over which data are transferred from a substation to the endpoints, the baseline harmonic being at least a second harmonic of the first fundamental frequency;
receiving status data from the endpoints, the status data for each endpoint specifying a number of bit errors that have been detected by the endpoint;
determining that the status data from at least a threshold number of the endpoints specify a number of bit errors that exceeds a threshold number of bit errors; and adjusting the first fundamental frequency to a second fundamental frequency that is higher than the first fundamental frequency, the second fundamental frequency being a frequency at which a lower harmonic than the baseline harmonic is within the downstream channel.

\* \* \* \* \*